Feb. 16, 1937.   R. A. DALLEY   2,071,255
WIND SCREEN
Filed Dec. 5, 1934
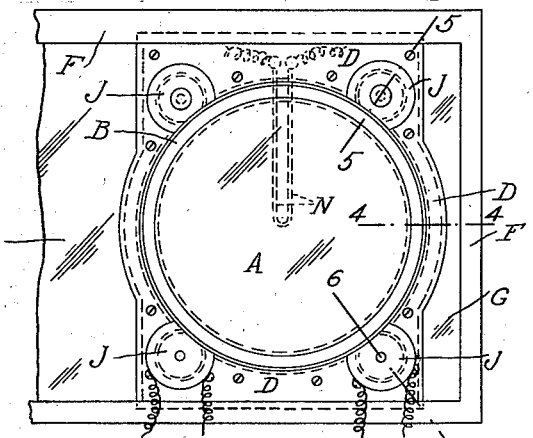
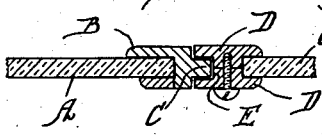
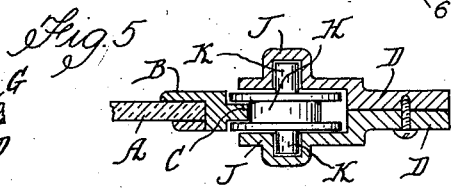
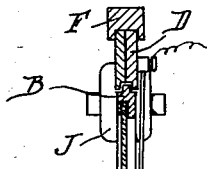
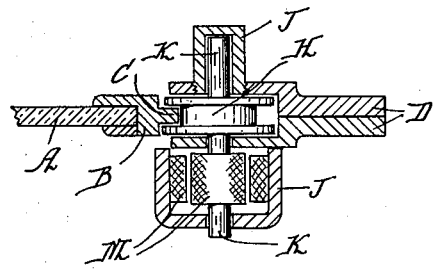
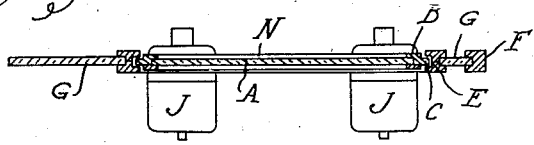

Patented Feb. 16, 1937

2,071,255

UNITED STATES PATENT OFFICE 2,071,255

WIND SCREEN

Richard Albert Dalley, Auckland, New Zealand, assignor to "Dalnat" Rotary Windscreen Company Limited, Auckland, New Zealand Application December 5, 1934, Serial No. 756,178
In New Zealand January 27, 1934

1 Claim. (Cl. 296—84)

This invention has reference to that known type of means used as a vision control for the windscreens of various forms of transport conveyances as ships, locomotives, tram vehicles, motor vehicles and such like, and in which a circular sheet of glass is embodied in the windscreen or combined therewith to be situated on its weather side, and is so mounted and driven as to cause it to rotate on a central axis and by such rotation to throw off through centrifugal action, any rain, snow, or other matter falling on the sheet. This sheet, or disc, is disposed to cover the vision line through the windscreen in order thus to keep such vision clear and unimpeded, and may either form in itself the sight screen, or may be combined with an ordinary screen to fit against the weather face thereof and protect the portion of the surface covered thereby.

The present invention has been devised with the object of providing for an improved manner of mounting and driving the said glass disc, more particularly in respect to its application to the wind-screen of an ordinary motor vehicle, by which its whole area is left uncovered, and by which it may be readily and cheaply fitted on an existing windscreen and may be driven with a small expenditure of power and at a readily controlled rate of speed. It has also been devised with the object of providing for such disc being aided in its cleaning action by the combination therewith of a wiper across which the disc passes in its rotation.

An additional object of the invention is to provide for such a disc also acting as a non-glare shield to protect the vision against the glare from the lights of approaching vehicles.

The invention comprises the provision of the glass disc with an encircling framing of metal so formed as to supply a flange extending radially all round, and the mounting of such framed disc within a carrying frame, formed with a circular groove in which the said flange fits so that the disc may rotate freely, and which frame has mounted therein carrying rollers with the peripheries of which the said flange engages and one, or more, of which rollers has means combined therewith whereby it, or they, may be rotated by electric power, in order that, by the frictional contact with the disc flange, the disc may be set spinning in the desired manner.

The said carrying frame may constitute the main frame of the windscreen in cases where the whole screen is formed by the glass disc, or may be fitted into an ordinary windscreen, as in use with the windscreen of a motor vehicle, in which case the disc will be positioned in the line of the driver's vision.

In the accompanying drawing the invention has been illustrated as thus fitted into a motor vehicle windscreen, and is hereinafter fully described in relation to such drawing, in which:—

Figure 1 is a rear face view of the windscreen showing the invention fitted therein.

Figure 2 is a sectional plan and

Figure 3 is a vertical section thereof, each view being taken through the centre of the disc.

Figure 4 is an enlarged sectional detail taken on the line 4—4 of Figure 1.

Figure 5 is a similar section taken on the line 5—5 of Figure 1.

Figure 6 is a similar section taken on the line 6—6 of Figure 1.

A is the glass disc which in this invention is provided with a rim framing B of metal and having a flange C extending radially on its outer edge all round the framing.

The disc A thus framed, is mounted within a main carrying frame D so constructed as to surround the disc edge with a groove E as shown in Figure 4 in which the flange C makes a neat sliding fit so that the framed disc may thus rotate freely within the carrying frame. Conveniently such frame D may be made, as shown in the drawing, by means of two flat plates of the necessary size arranged face to face and each formed with the circular opening to receive the disc and with the edge of such opening rebated so that when the plates are fastened together, the groove E is formed around the opening.

This carrying frame D is, in the instance shown, let into the frame F of an ordinary windscreen, the glass G of such windscreen being broken away to receive it and then jointed into the carrying frame edges, so that the disc A then extends in the plane of the windscreen and over that part in which it is desired to maintain a clear vision.

Arranged within the frame D, at approved points around the periphery of the disc A, are a number of guide rollers H. Four of these are shown in the drawing, two being above the centre and two below. These rollers are designed to carry the disc A and their peripheries are made to receive the flange C of the disc rim, as shown in Figures 5 and 6, so that the disc is thus free to rotate on these rollers. Each roller is housed within a casing J formed on the frame plates and embodying journals for the spindle K of the roller to fit in. The casing is however open to the edge of the circular opening in the frame so that the roller edge may contact with the disc flange in the required manner. Other ways of mounting the rollers may however be employed.

Associated with each of the two lower rollers H are means, shown in Figure 6, whereby it may be electrically driven in order thus that by the engagement of these two rollers with the rim of the disc A, such disc will be set spinning on its own axis in the required manner. For this purpose the casing J on the inside of the screen may be enlarged to receive a small electric motor M which is associated with the spindle K of the roller and is connected with any source of electrical energy available, to thus drive the motor and rotate the roller. In a motor vehicle this source of energy may conveniently be the storage battery of the lighting and ignition system.

A wiper device, or arm, N is mounted on the frame D outside the disc, so that it extends across the face of the disc in a radial direction and thus will act to keep the disc face clear of accumulations during the disc's rotation. This may be of any ordinary wiper arm form, but may be formed, as shown, of an electric resistance wire that is connected with the electric energy source beforementioned so that it will be heated, and thereby serve more effectually to wipe the disc surface from accumulations of snow, ice or the like. The provision of a wiper device of this nature will aid the self clearing of the disc under its centrifugal action, and thus allow of the disc being rotated at a slower rate than would be required were the whole of its clearing effected by the centrifugal action.

I claim:—

In windscreens of motor vehicles and the like, a metallic frame composed of two complemental flat plates each provided with a circular opening, the adjacent edges of the plates about the opening and about the outer edges being rabbeted to form grooves, a number of circular enclosure casings disposed at spaced intervals in the plate around the circular opening and formed to communicate at their inner parts with the space in such opening, a grooved roller journalled in each said casings, a glass disc, a metallic rim encircling and carrying the disc and having a radially projecting flange around its edge and fitted into the circular opening in the frame so that the flange fits into the groove therein while the peripheral edge of the flange engages in the grooves in the several rollers, a wiper arm fixed to the carrying frame and arranged to extend inwardly across the face of the disc, and means for driving at least one of said rollers.

RICHARD ALBERT DALLEY.